US012786083B2

(12) United States Patent
Mayo et al.

(10) Patent No.: US 12,786,083 B2
(45) Date of Patent: Nov. 3, 2026

(54) MANAGING ALERTS FOR INCIDENT RESPONSE

(71) Applicant: PagerDuty, Inc., San Francisco, CA (US)

(72) Inventors: Micah Mayo, San Francisco, CA (US); Mitra Khatibi, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 18/424,304

(22) Filed: Jan. 26, 2024

(65) Prior Publication Data

US 2025/0247314 A1 Jul. 31, 2025

(51) Int. Cl.
*H04L 43/062* (2022.01)
*H04L 41/0631* (2022.01)
*H04L 43/091* (2022.01)

(52) U.S. Cl.
CPC ........ *H04L 43/062* (2013.01); *H04L 41/0631* (2013.01); *H04L 43/091* (2022.05)

(58) Field of Classification Search
CPC .. H04L 43/062; H04L 43/091; H04L 41/0631
See application file for complete search history.

(56) References Cited

U.S. PATENT DOCUMENTS 7,912,956 B1 * 3/2011 Williams .............. G06F 9/5083 709/224
8,620,624 B2 * 12/2013 Skibiski .............. H04L 41/0618 702/188
9,594,801 B2 * 3/2017 Wong ....................... H04L 67/10
9,607,074 B2 * 3/2017 Tee ...................... G06F 11/0709
9,871,810 B1 * 1/2018 Miskovic .............. G06F 21/552
10,476,906 B1 * 11/2019 Siddiqui ............... H04L 63/145
10,601,863 B1 * 3/2020 Siddiqui ............... H04L 63/145
10,610,780 B1 * 4/2020 Casey ................... A63F 13/335
10,616,266 B1 * 4/2020 Otvagin .............. G06F 9/45558
10,671,721 B1 * 6/2020 Otvagin ................ H04L 63/145

(Continued)

OTHER PUBLICATIONS

Bonnell et al., "Intelligent Alert Grouping: What It Is and How To Use It", PagerDuty, Oct. 18, 2021, 3 pp., Retrieved from the Internet on Apr. 3, 2024 from URL: https://www.pagerduty.com/blog/intelligent-alert-grouping-what-it-is-and-how-to-use-it/.

(Continued)

*Primary Examiner* — Abdelbasst Talioua
(74) *Attorney, Agent, or Firm* — Shumaker & Sieffert, P.A.

(57) ABSTRACT

Techniques are described for a system configured to assign one or more services to a first compute node of a set of compute nodes. The system may obtain an alert for a service. The system may determine an alert context for the alert. The system may add the alert to an alert group of a plurality of alert groups. The system may generate an updated alert group context for the alert group. The system may add a second compute node to the set of compute nodes. The system may provide a plurality of alert group contexts including the updated alert group context to the second compute node. The system may reassign at least one service to the second compute node based on an updated set of compute nodes, wherein the updated set of compute nodes is determined based on a change to the set of compute nodes.

20 Claims, 7 Drawing Sheets

(56) References Cited

U.S. PATENT DOCUMENTS

| | | | | |
|---|---|---|---|---|
| 10,785,255 | B1 * | 9/2020 | Otvagin | H04L 63/145 |
| 11,221,908 | B1 * | 1/2022 | Batta | G06F 11/3072 |
| 11,681,966 | B2 * | 6/2023 | Milden | G06F 40/247 705/7.28 |
| 11,720,599 | B1 * | 8/2023 | Lin | G06F 16/2246 707/738 |
| 12,079,100 | B1 * | 9/2024 | Deaderick | G06F 11/0781 |
| 12,182,104 | B1 * | 12/2024 | Singh | G06F 16/2228 |
| 2010/0162383 | A1 * | 6/2010 | Linden | G06F 11/181 726/13 |
| 2015/0195165 | A1 * | 7/2015 | Boger | G06F 11/0709 709/224 |
| 2016/0219117 | A1 * | 7/2016 | Marlatt | G06F 21/62 |
| 2016/0342409 | A1 * | 11/2016 | Acker | G06F 8/65 |
| 2018/0295185 | A1 * | 10/2018 | Kopetz | H04L 67/12 |
| 2019/0312898 | A1 * | 10/2019 | Verma | G06N 3/044 |
| 2019/0319859 | A1 * | 10/2019 | Casey | G06N 20/00 |
| 2020/0057850 | A1 * | 2/2020 | Kraus | G06N 3/09 |
| 2020/0259861 | A1 * | 8/2020 | Margel | H04L 63/20 |
| 2020/0319935 | A1 * | 10/2020 | Srivastava | G06F 9/5011 |
| 2021/0203673 | A1 * | 7/2021 | Dos Santos | H04L 41/0609 |
| 2021/0349799 | A1 * | 11/2021 | Grant | H04L 67/12 |
| 2021/0399954 | A1 * | 12/2021 | Dabell | G06F 9/45558 |
| 2022/0027197 | A1 * | 1/2022 | Tang | G06F 9/5072 |
| 2022/0141201 | A1 * | 5/2022 | Lal | H04L 63/1475 |
| 2022/0247769 | A1 * | 8/2022 | Erlingsson | G06F 9/5072 |
| 2022/0283712 | A1 * | 9/2022 | Goren | G06F 11/2094 |
| 2023/0100716 | A1 * | 3/2023 | Singh | G06F 11/079 714/48 |
| 2023/0118563 | A1 * | 4/2023 | Yadav | H04L 63/1408 726/1 |
| 2023/0412449 | A1 * | 12/2023 | Kannan | H04L 41/0604 |
| 2024/0036998 | A1 * | 2/2024 | Poprzen | G06F 11/203 |
| 2024/0045747 | A1 * | 2/2024 | Poprzen | G06F 9/5077 |
| 2024/0106694 | A1 * | 3/2024 | Koohmarey | G06F 11/079 |
| 2024/0231333 | A9 * | 7/2024 | Nixon | G05B 19/4184 |
| 2024/0259251 | A1 * | 8/2024 | Deshmukh | H04L 67/61 |
| 2024/0291724 | A1 * | 8/2024 | Saha | H04L 41/16 |
| 2024/0323109 | A1 * | 9/2024 | Wang | G06F 17/18 |
| 2024/0330090 | A1 * | 10/2024 | Mandal | G06F 11/0769 |
| 2024/0380785 | A1 * | 11/2024 | Lahav | H04L 63/1433 |
| 2024/0385892 | A1 * | 11/2024 | Boviz | G06F 9/505 |

OTHER PUBLICATIONS

Pagerduty, "AlertGroupingParameters", 1 pp., Retrieved from the Internet on Apr. 3, 2024 from URL: https://developer.pagerduty.com/api-reference/2ffca99cb89d1-alert-grouping-parameters.

Pagerduty, "AlertGroupingSetting", 2 pp., Retrieved from the Internet on Apr. 3, 2024 from URL: https://developer.pagerduty.com/api-reference/f571f9fbfb711-alert-grouping-setting.

Pagerduty, "Context", 1 pp., Retrieved from the Internet on Apr. 3, 2024 from URL: https://developer.pagerduty.com/api-reference/c2NoOjI3NDc5OTM-context.

Pagerduty, "Intelligent Alert Grouping", 7 pp., Retrieved from the Internet on Apr. 3, 2024 from URL: https://support.pagerduty.com/docs/intelligent-alert-grouping.

Wikipedia, "Load (computing)", Wikipedia, Nov. 12, 2023, 5 pp., Retrieved from the Internet on Apr. 3, 2024 from URL: https://en.wikipedia.org/wiki/Load_(computing).

* cited by examiner

MANAGING ALERTS FOR INCIDENT RESPONSE

TECHNICAL FIELD

This disclosure relates generally to managing incident response alerts.

BACKGROUND

Operations computing systems may evaluate events from services executing at one or more customer systems to determine which events should be classified as alerts. Operations computing systems may suppress, suspend, deduplicate, or group alerts into an incident that prompts on-call responders to address any disruption to a service of a customer system from which an incident may have originated.

SUMMARY

Aspects of the present disclosure describe techniques for managing alerts for incident response. An operations computing system, according to the techniques described herein, may manage the scale of an infrastructure implemented to group alerts based on a context (e.g., a brief description included in an alert, logs associated with an alert, etc.) of the alerts. For example, the operations computing system may implement a set of compute nodes configured to group alerts of multiple services with a clustering algorithm. A compute node of the set of compute nodes may determine a context of an incoming alert to group the alert based on the determined context. The compute node may update an alert group context, corresponding to an alert group the alert was grouped with, based on the determined alert. An operations computing system, according to the techniques described herein, may dynamically manage assignments of one or more services to a compute node of a set of compute nodes to efficiently group alerts for the one or more services.

In some instances, the operations computing system may share contexts corresponding to groups of alerts to new compute nodes added to the set of compute nodes. In this way, the operations computing system may scale the set of compute nodes to efficiently group alerts for a growing number of services implemented by customers of the operations computing system. In some instances, the operations computing system may reassign one or more services to a compute node from the set of compute nodes that will be configured to group alerts for the one or more services. For example, the operations computing system may remove a compute node from the set of compute nodes, resulting in a need for reassigning one or more services assigned to the deleted compute node to another compute node of the set of compute nodes. In some examples, the operations computing system may reassign the one or more services to a compute node based on records of network traffic utilized by the one or more services. In this way, the operations computing system may optimize the set of compute nodes configured to group alerts for various services by, for example, reducing storage requirements with the deletion of a compute node from the set of compute nodes.

In one example, a system comprises one or more processors having access to a memory. The one or more processors may be configured to assign one or more services of a plurality of services to a first compute node of a set of compute nodes. The one or more processors may further be configured to obtain an incident response alert for a service of the one or more services. The one or more processors may further be configured to determine, by the first compute node, an alert context for the incident response alert. The one or more processors may further be configured to add, by the first compute node and based on the alert context, the incident response alert to an alert group of a plurality of alert groups. The one or more processors may further be configured to generate, based on the alert context, an updated alert group context for the alert group. The one or more processors may further be configured to add a second compute node to the set of compute nodes. The one or more processors may further be configured to provide a plurality of alert group contexts including the updated alert group context to the second compute node. The one or more processors may further be configured to reassign at least one service of the plurality of services to the second compute node based on an updated set of compute nodes including the second compute node, wherein the updated set of compute nodes is determined based on a change to the set of compute nodes.

In another example, a method may include assigning, by a computing system, one or more services of a plurality of services to a first compute node of a set of compute nodes. The method may further include obtaining, by the computing system, an incident response alert for a service of the one or more services. The method may further include determining, by the first compute node of the computing system, an alert context for the incident response alert. The method may further include adding, by the first compute node and based on the alert context, the incident response alert to an alert group of a plurality of alert groups. The method may further include generating, by the computing system and based on the alert context, an updated alert group context for the alert group. The method may further include adding, by the computing system, a second compute node to the set of compute nodes. The method may further include providing, by the computing system, a plurality of alert group contexts including the updated alert group context to the second compute node. The method may further include reassigning, by the computing system, at least one service of the plurality of services to the second compute node based on an updated set of compute nodes including the second compute node, wherein the updated set of compute nodes is determined based on a change to the set of compute nodes.

In yet another example, a computer-readable storage medium encoded with instructions that, when executed, causes at least one processor of a computing device to assign one or more services of a plurality of services to a first compute node of a set of compute nodes. The instructions may further cause the at least one processor to obtain an incident response alert for a service of the one or more services. The instructions may further cause the at least one processor to determine, by the first compute node, an alert context for the incident response alert. The instructions may further cause the at least one processor to add, by the first compute node and based on the alert context, the incident response alert to an alert group of a plurality of alert groups. The instructions may further cause the at least one processor to generate, based on the alert context, an updated alert group context for the alert group. The instructions may further cause the at least one processor to add a second compute node to the set of compute nodes. The instructions may further cause the at least one processor to provide a plurality of alert group contexts including the updated alert group context to the second compute node. The instructions may further cause the at least one processor to reassign at least one service of the plurality of services to the second compute node based on an updated set of compute nodes including the second compute node, wherein the updated set of compute nodes is determined based on a change to the set of compute nodes.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

Like reference characters denote like elements throughout the text and figures.

DETAILED DESCRIPTION

Figure 1:
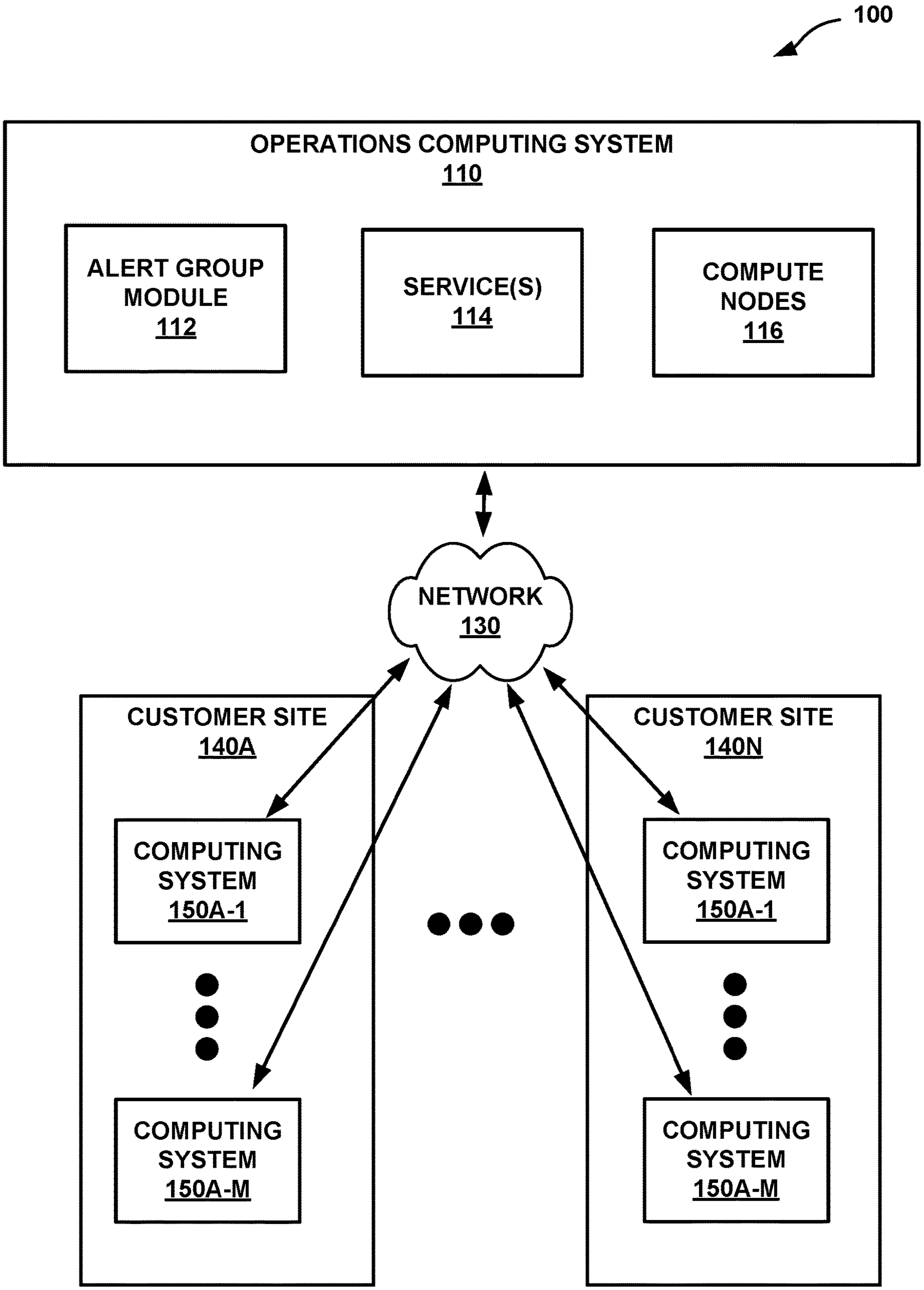
FIG. 1 is a block diagram illustrating an example system for grouping incident response alerts, in accordance with the techniques of this disclosure.

FIG. 1 is a block diagram illustrating an example system 100 for grouping incident response alerts, in accordance with the techniques of this disclosure. In the example of FIG. 1, system 100 may include operations computing system 110, customer sites 140A-140N (collectively referred to herein as "customer sites 140"), and network 130.

Network 130 may include any public or private communication network, such as a cellular network, Wi-Fi network, or other type of network for transmitting data between computing devices. In some examples, network 130 may represent one or more packet switched networks, such as the Internet. Operations computing system 110 and computing systems 150 of customer sites 140, for example, may send and receive data across network 130 using any suitable communication techniques. For example, operations computing system 110 and computing systems 150 may be operatively coupled to network 130 using respective network links. Network 130 may include network hubs, network switches, network routers, terrestrial and/or satellite cellular networks, etc., that are operatively inter-coupled thereby providing for the exchange of information between operations computing system 110, computing systems 150, and/or another computing device or computing system. In some examples, network links of network 130 may include Ethernet, ATM or other network connections. Such connections may include wireless and/or wired connections.

Customer sites 140 may be managed by an administrator of system 100. In some instances, customer sites 140 may include a cloud computing service, corporations, banks, retailers, non-profit organizations, or the like. Each customer site of customer sites 140 (e.g., customer site 140A and customer site 140N) may correspond to different customers, such as cloud computing services, corporations, etc.

Customer sites 140 may include computing systems 150. In some examples, computing systems 150 may represent a cloud computing system that provides one or more services via network 130. Computing systems 150 may include a collection of hardware devices, software components, and/or data stores that can be used to implement one or more applications or services related to business operations of respective client sites 140. Computing systems 150 may represent a cloud-based implementation. In some examples computing systems 150 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), or the like.

Operations computing system 110 may provide computer operations management services, such as a network computer. Operations computing system 110 may implement various techniques for managing data operations, networking performance, customer service, customer support, resource schedules and notification policies, event management, or the like for computing systems 150. Operations computing system 110 may be arranged to interface or integrate with one or more external systems such as telephony carriers, email systems, web services, or the like, to perform computer operations management. Operations computing system 110 may monitor and obtain various events and/or performance metrics from computing systems 150 of customer sites 140. Operations computing system 110 may determine incident response alerts (also referred to herein simply as "alerts") based on obtained events. Operations computing system 110 may be arranged to monitor the performance of computer operations of customer sites 140. For example, operations computing system 110 may be arranged to monitor whether applications or systems of customer sites 140 are operational, network performance associated with customer sites 140, trouble tickets and/or resolutions associated with customer sites 140, or the like. Operations computing system 110 may include applications with computer executable instructions that transmit, receive, or otherwise process instructions and data when executed.

Operations computing system 110 may include, but is not limited to, remote computing systems, such as one or more desktop computers, laptop computers, mainframes, servers, cloud computing systems, etc. capable of sending information to and receiving information from computing systems 150 via a network, such as network 130. Operations computing system 110 may host (or at least provides access to) information associated with one or more applications or application services executable by computing systems 150, such as operation management client application data. In some examples, operations computing system 110 represents a cloud computing system that provides the application services via the cloud.

In the example of FIG. 1, operations computing system 110 may include alert group module 112, one or more services 114, and compute nodes 116. Alert group module 112 may include computer-readable instructions for grouping or combining similar alerts into a single incident to reduce notification noise. Alert group module 112 may provide on-call responders with context of the alert to effectively respond to incidents. Alert group module 112 may orchestrate alert grouping by assigning one or more services of services 114 to a compute node of compute nodes 116. Compute nodes 116 may include partitioned resources (e.g., hardware resources) of operations computing system

110 configured to group alerts of services 114. For example, alert group module 112 may partition a set of computing devices of operations computing system 110 to create compute nodes 116. Each compute node of compute nodes 116 includes sufficient processing power and memory to group alerts for one or more services of services 114.

Services 114 may include software applications configured to support operations of computing systems 150. For example, services 114 may include a mobile application, a web application, an Application Programming Interface (API), or the like for technical and/or business functions provided by computing systems 150 of customer sites 140. Services 114 may be integrated with or include a data monitoring tool configured to detect events corresponding to functionality of services 114. Services 114 may detect event data that indicates something has occurred during the operation of services 114. In some instances, services 114 may normalize event data, according to a pre-defined incident response standard, to generate an alert. Although illustrated as executing at operations computing system 110, services 114 may execute at any of computing systems 150. For example, operations computing system 110 may send configuration information for services 114 (e.g., software code files for services 114) to computing systems 150. Services 114 may include data monitoring tools configured to detect events and determine alerts based on the events while executing at computing systems 150. Services 114 may send alerts to operations computing system 110 to suppress, suspend, deduplicate, or group alerts into an incident that may be resolved automatically by operations computing system 110 or by an on-call responder.

In accordance with the techniques described herein, operations computing system 110 may manage compute nodes 116 to group alerts of services 114. Operations computing system 110, or more specifically alert group module 112, may assign one or more services of services 114 to a compute node of compute nodes 116. Alert group module 112 may assign a service to a compute node by providing a service identifier (e.g., service name, service location address, etc.) to a compute node. Alert group module 112 may configure a compute node of compute nodes 116 to group alerts for the one or more services of services 114 assigned to the compute node.

Alert group module 112 may obtain an incident response alert for a service of services 114. In some instances, alert group module 112 may obtain an incident response alert from an application engine executing at operations computing system 110. Operations computing system 110 may include one or more application engines configured to ingest event data and determine incident response alerts based on the event data. In some examples, alert group module 112 may obtain an incident response alert from a data monitoring tool integrated as part of services 114. Services 114 may include a data monitoring tool configured to determine incident response alerts for respective services 114 based on event data. Alert group module 112 may obtain an incident response alert that includes a service identifier corresponding to a service of services 114 associated with the obtained incident response alert. Alert group module 112 may send the incident response alert to a compute node assigned to the service associated with the incident response alert based on a service identifier included in the incident response alert. Alert group module 112 may send alerts to compute nodes 116 that include a summary of the alert (e.g., a server supporting a service is down, a service is crashing, etc.).

Compute nodes 116 may determine an alert context for an incident response alert. Compute nodes 116 may apply a machine learning model that implements a clustering algorithm to determine the alert context. Compute nodes 116 may determine an alert context for an alert based on a summary included in the alert. Compute nodes 116 may generate a token for each word included in a summary of the incident response alert. Compute nodes 116 may assign a weight to each generated token. Compute nodes 116 may determine the alert context as values corresponding to weights assigned to the tokens. The alert context includes one or more data structures (e.g., a vector including weight values, a string summarizing an alert, etc.) defining characteristics of an incident response alert. In some examples, the alert context may include one or more data structures defining characteristics of an incident response alert, such as a timestamp when an incident response alert was triggered or user feedback associated with an incident response alert (e.g., a string, Boolean, or integer indicating an accuracy of the alert context, merging or unmerging alerts, moving alerts, bulk acknowledgement or resolution of alerts, etc.).

Compute nodes 116 may add incident response alerts to alert groups based on alert contexts. Compute nodes 116 may add an incident response alert to an alert group by comparing values of an alert context corresponding to the incident response alert and values of saved alert group contexts. An alert group context may include one or more data structures defining a compilation or normalization of alert contexts included in an alert group corresponding to the alert group context. Compute nodes 116 may determine whether the weight values associated with the alert satisfy a threshold similarity when compared to weight values of alert group contexts. Compute nodes 116 may save alert group contexts for alert groups that include a normalization of token weights of incident response alerts included in an alert group. Compute nodes 116 may add an incident response alert to an alert group based on values of the determined alert context corresponding to the incident response alert being the closest to values of the alert group context corresponding to the alert group.

Alert group module 112 may generate updated alert group contexts based on determined alert contexts. For example, alert group module 112 may update an alert group context by renormalizing token weight values of the alert group context based on token weight values of an alert context corresponding to an incident response alert recently added to the alert group. In some examples, alert group module 112 may update an alert group context for an alert group based on user feedback associated with the alert group context (e.g., user feedback indicating the alerts included in an alert group are inaccurate).

Alert group module 112 may add a compute node to compute nodes 116. Alert group module 112 may add a compute node to compute nodes 116 to scale operations of incident response alert grouping. Alert group module 112 may add a compute node to compute nodes 116 based on a demand of services 114. For example, alert group module 112 may monitor network traffic of services 114 to determine a volume of events and/or incidents corresponding to each service of services 114. Alert group module 112 may monitor network traffic of services 114 to determine a volume of events and/or incidents corresponding to each service of services 114 based on, for example, a load of each compute node of compute nodes 116 determined as a function of response times a compute node processes and groups an incident response alert. Responsive to alert group module 112 determining that the set of compute nodes included in compute nodes 116 is not sufficient to quickly group alerts for services 114 (e.g., determining response times of a compute node processing an alert is above a predefined response time threshold), alert group module 112 may add a compute node to compute nodes 116 to dedicate more computational resources to grouping incident response alerts for services 114.

Alert group module 112 may provide alert group contexts to new compute nodes added to compute nodes 116. Alert group module 112 may provide alert group contexts to new compute nodes that include any recently updated alert group contexts. The newly added compute node of compute nodes 116 may save the alert group contexts to group subsequently obtained incident response alerts to a most recent compilation of alert group contexts. Alert group module 112 may serially provide updated alert group contexts to compute nodes of compute nodes 116 based on a service of services 114 associated with the updated alert group contexts. In other words, alert group module 112 may orchestrate which compute nodes of compute nodes 116 are provided particular alert group contexts based on a service identifier included in the alert group contexts matching the service identifier assigned to a compute node of compute nodes 116.

Alert group module 112 may reassign at least one service of services 114 to compute nodes 116 based on a determined change to compute nodes of compute nodes 116. Alert group module 112 may determine a change to compute nodes 116 such as a new compute node added to compute nodes 116 or a compute node removed from compute nodes 116. Alert group module 112 may reassign services 114 to compute nodes 116 by generating a partition number based on a number of compute nodes included in compute nodes 116. Alert group module 112 may generate a partition number by dividing a number of services included in services 114 and a number of compute nodes included in compute nodes 116. Alert group module 112 may assign a partition number of services to a compute node of compute nodes 116. For example, alert group module 112 may determine that services 114 includes one-hundred services and compute nodes 116 includes twenty compute nodes based on a change to compute nodes 116. Alert group module 112 may determine a partition number for reassigning services 114 to compute nodes 116 is five. Alert group module 112 may assign five different services of services 114 to each compute node of compute nodes 116.

In some instances, alert group module 112 may reassign services 114 to compute nodes 116 based on network traffic logs corresponding to services 114. For example, alert group module 112 may determine a service of services 114 has a high volume of incident response alerts. In this example, alert group module 112 may reassign the service with a high volume of alerts to a compute node that has the computational resources (e.g., available processing or memory resources) to handle the high volume of alerts.

The techniques described herein may provide one or more technical advantages that realize one or more practical applications. For example, operations computing system 110 may adjust a number of compute nodes of compute nodes 116 based on operational requirements of services 114 to optimize efficiently for incident response alert grouping. Operations computing systems may implement clustering algorithms for intelligent alert grouping that include sequential steps of context determination and updating alert group contexts and alerts are obtained on the fly. Operations computing systems may implement clustering algorithm steps that rely on a previous context rather than using pre-defined contexts. Operations computing systems that group alerts using machine learning clustering algorithms sequentially group alerts because the context would be different in each step and impacts the quality of the alert grouping and how alerts are grouped. By sequentially grouping alerts, operations computing systems may reduce drift in alert contexts used in each step, resulting in higher quality alert groups. Conventionally, operations computing systems may implement intelligent alert grouping by using a modulo hashing strategy to assign services to compute nodes that relies on a static set of compute nodes (e.g., a fixed number of compute node instances). However, a static set of compute nodes may result in a slow grouping of alerts when compute nodes are overworked, an inefficient infrastructure when compute nodes do not receive any alerts to group, and/or an interruption in alert grouping when there is a change to the set of compute nodes (e.g., add a compute node to the set of compute nodes, remove a compute node to the set of compute nodes, etc. for conventional techniques may include rebuilding and redeploying compute nodes which may restart progress of previously instantiated compute nodes). Alert group module 112 of operations computing system 110, according to the techniques described herein, may dynamically orchestrate the sharing of alert group contexts to compute nodes 116. Alert group module 112 may automatically change a number of compute nodes of compute nodes 116 based demands of services 114. In this way, alert group module 112 may automatically scale or reduce a number of dedicated resources (e.g., compute nodes 116) tasked with grouping incident response alerts of a growing or shrinking number of services 114. For example, operations computing system 110 may include a growing number of services 114 that may require additional compute nodes to group alerts for the growing number of services 114. Alert group module 112 may monitor performance of compute nodes 116 and add compute nodes to efficiently distribute workloads for alert grouping across compute nodes 116 without interrupting current operations of compute nodes 116 (e.g., without stopping a server and restarting compute nodes as a result of manually increasing the number of compute nodes).

Figure 2:
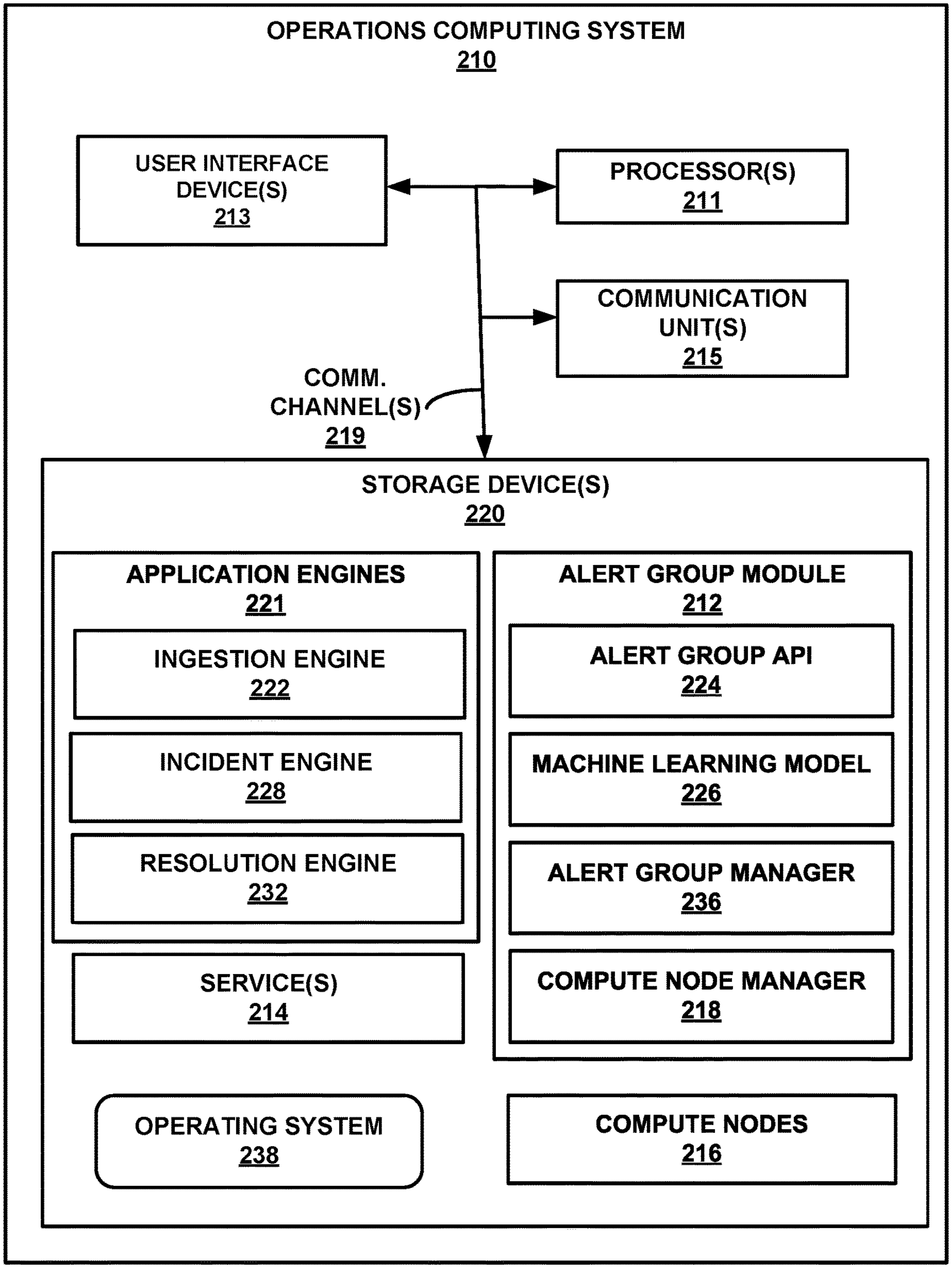
FIG. 2 is a block diagram illustrating an example computing system for managing incident response alert groups, in accordance with one or more techniques of this disclosure.

FIG. 2 is a block diagram illustrating example computing system 210 for managing incident response alert groups, in accordance with one or more techniques of this disclosure. Operations computing system 210 may be an example or alternative implementation of operations computing system 110 of FIG. 1. Alert group module 212, services 214, and compute nodes 216 of FIG. 2 may be example or alternative implementations of alert group module 112, services 114, and compute nodes 116 of FIG. 1, respectively.

Operations computing system 210, in the example of FIG. 2, may include user interface (UI) devices 213, processors 211, communication units 215, and storage devices 220. Communication channels 219 ("COMM channel(s) 219") may interconnect each of components 213, 211, 215, and 220 for inter-component communications (physically, communicatively, and/or operatively). In some examples, communication channel 219 may include a system bus, a network connection, an inter-process communication data structure, or any other method for communicating data.

UI devices 213 may be configured to function as an input device and/or an output device for operations computing system 210. UI device 213 may be implemented using various technologies. For instance, UI device 213 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 213 may include a presence-sensitive device that may receive tactile input from a user of operations computing system 210.

UI device 213 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, miniLED, microLED, organic light-emitting diode (OLED) display, e-ink, or similar monochrome or color display capable of outputting visible information to a user of operations computing system 210. Additional examples of an output device include a speaker, a haptic device, or other device that can generate intelligible output to a user. For instance, UI device 213 may present output as a graphical user interface that may be associated with functionality provided by operations computing system 210.

Processors 211 may implement functionality and/or execute instructions within operations computing system 210. For example, processors 211 may receive and execute instructions that provide the functionality of application engines 221, OS 238, alert group module 212, services 214, and compute nodes 216. These instructions executed by processors 211 may cause operations computing system 210 to store and/or modify information within storage devices 220 or processors 211 during program execution. Processors 211 may execute instructions of application engines 221, OS 238, alert group module 212, services 214, and compute nodes 216 to perform one or more operations. That is application engines 221, OS 238, alert group module 212, services 214, and compute nodes 216 may be operable by processors 211 to perform various functions described herein.

Storage devices 220 may store information for processing during operation of operations computing system 210 (e.g., operations computing system 210 may store data accessed by application engines 221, OS 238, alert group module 212, services 214, and compute nodes 216 during execution). In some examples, storage devices 220 may be a temporary memory, meaning that a primary purpose of storage devices 220 is not long-term storage. Storage devices 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 220 may include one or more computer-readable storage media. Storage devices 220 may be configured to store larger amounts of information than volatile memory. Storage devices 220 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 220 may store program instructions and/or information (e.g., within database 223) associated with application engines 221, OS 238, alert group module 212, services 214, and compute nodes 216.

Communication units 215 may communicate with one or more external devices via one or more wired and/or wireless networks by transmitting and/or receiving network signals on the one or more networks. Examples of communication units 215 include a network interface card (e.g., such as an Ethernet card), an optical transceiver, a radio frequency transceiver, a GNSS receiver, or any other type of device that can send and/or receive information. Other examples of communication unit 215 may include short wave radios, cellular data radios (for terrestrial and/or satellite cellular networks), wireless network radios, as well as universal serial bus (USB) controllers.

OS 238 may control the operation of components of operations computing system 210. For example, OS 238 may facilitate the communication of application engines 221, alert group module 212, services 214, and compute nodes 216 with processors 211, storage devices 220, and communication units 215. OS 238 may have a kernel that facilitates interactions with underlying hardware of operations computing system 210 and provides a fully formed application space capable of executing a wide variety of software applications having secure partitions in which each of the software applications executes to perform various operations.

Application engines 221 may include ingestion engine 222, incident engine 228, and resolution engine 234. Ingestion engine 222 may be arranged to receive and/or obtain one or more different types of operations events provided by various sources. Ingestion engine 222 may obtain operations events that include alerts regarding system errors, warnings, failure reports, customer service requests, status messages, or the like. Ingestion engine 222 may be configured to obtain operations events that may be variously formatted messages that reflect the occurrence of events and/or incidents that have occurred in an organization's computing system (e.g., computing systems 150 of FIG. 1). Ingestion engine 222 may obtain operations events that may include SMS messages, HTTP requests or posts, API calls, log file entries, trouble tickets, emails, or the like. Ingestion engine 222 may obtain operations events that may be associated with one or more service teams that may be responsible for resolving issues related to the operations events. In some examples, ingestion engine 222 may obtain operations events from one or more external services that are configured to collect operations events. Ingestion engine 222 may send operations events to incident engine 228.

Incident engine 228 may be configured to orchestrate various actions related to analyzing operations events. For example, incident engine 228 may orchestrate actions of alerting or notifying teams of an operations event. Incident engine 228 may orchestrate actions related to classifying operations events based on severity (e.g., critical, error, warning, information, unknown, etc.). Incident engine 228 may orchestrate actions related to outputting the severity of operations events to teams of operations computing system 210. Incident engine 228 may orchestrate actions related to determining a time frame or urgency for addressing an incident. Incident engine 228 may orchestrate actions related to notifying relevant computing systems of incidents. Incident engine 228 may orchestrate actions related to prioritizing incidents for eventual processing. Incident engine 228 may orchestrate actions related to identifying workflows or templates of actions that may be used to resolve certain incidents in an automated way. Incident engine 228 may determine an incident for a service of services 214 based on alert groups managed by alert group module 212. For example, incident engine 228 may determine an incident as a collection of alerts of an alert group specifying a disruption to a service of services 214 that prompts a notification to be sent to an on-call responder.

Resolution tracker 234 may be configured to monitor details related to the status of operations events obtained by operations computing system 210. For example, resolution tracker 234 may be configured to monitor incident life-cycle metrics associated with operations events (e.g., creation time, acknowledgement time(s), resolution time, etc.), resources responsible for resolving the events (e.g., application engines 221), and so on. Resolution tracker 234 may store data obtained from monitoring the details related to the status of operations events.

In the example of FIG. 2, alert group module 212 may include alert group Application Programming Interface (API) 224, machine learning model 226, alert group manager 236, and compute node manager 218. Alert group API 224 may include an API conforming to a representational state transfer (REST or RESTful) architectural style to enable connection and communication between components of alert group module 212, services 214, and compute nodes 216. UI devices 213 may enable an administrator of operations computing system 210 to input API calls established by alert group API 224. For example, alert group API 224 may receive instructions to create or remove compute nodes from compute nodes 216 via an API call an administrator executed via UI devices 213.

Compute node manager 218 may orchestrate changes to compute nodes 216. For example, responsive to alert group API 224 receiving instructions to add a compute node to compute nodes 216, alert group API 224 may relay the instructions to compute node manager 218. Compute node manager 218 may allocate additional resources of operations computing system 210 (e.g., processing and storage resources) to generate a new compute node to add to compute nodes 216. Compute node manager 218 may provide most recent alert group contexts maintained by alert group manager 236 to the new compute node of compute nodes 216 so that the new compute node may group incoming incident response alerts based on updated alert group contexts.

Compute node manager 218 may assign services 214 to compute nodes 216 based on a change to compute nodes 216 initiated by alert group API 224. Compute node manager 218 may assign one or more services of services 214 to compute nodes 216 based on service identifiers of services 214 that are also included in incident response alerts (e.g., in metadata of incident response alerts). In some instances, compute node manager 218 may reassign services 214 to compute nodes 216 by generating a partition number based on a number of services included in services 214 and a number of compute nodes included in an updated set of compute nodes included in compute nodes 216. In some examples, compute node manager 218 may reassign services 214 to compute nodes 216 based on network traffic records associated with services 214. For example, alert group API 224 may collect network traffic logs (e.g., network traffic throughput) for each service of services 214. Alert group API 225 may store network traffic logs with compute node manager 218. Compute node manager 218 may analyze network traffic logs for services 214 to determine whether at least one network traffic logs satisfy a threshold value. For example, compute node manager 218 may determine a network log for a service satisfies a high network traffic throughput threshold when the network log indicates the service had a network traffic throughput value above a predefined value. Compute node manager 218 may add a compute node to compute nodes 216 and reassign the service associated with the network log satisfying the threshold to the new compute node.

In some instances, compute node manager 218 may assign services 214 to compute nodes 216 based on a health of compute nodes 216. Compute node manager 218 may monitor a health of compute nodes 216 such as processing usage, processing utilization, processing load average, processing cache size, response time, or the like of each compute node of compute nodes 216. Compute node manager 218 may collect a health of compute nodes 216 as key performance indicator (KPI) values of each compute node of compute nodes 216. Compute node manager 218 may determine a health of a compute node of compute nodes 216 satisfies thresholds that may correspond to a compute node that is overworked, a compute node that does not have enough work, and/or a compute node that is defective. For example, compute node manager 218 may determine a compute node of compute nodes 216 is overworked based on values corresponding to a health of the compute node (e.g., processing metrics) being above a predefined threshold value. Compute node manager 218 may initiate a change (e.g., add or remove a compute node) to compute nodes 216 based on the health of compute nodes 216 (e.g., responsive to KPI values of a compute node satisfying a threshold).

Machine learning model 226 may include a clustering algorithm implemented by compute nodes 216 to group alerts for services 214. Alert group API 224 may send machine learning model 226 to compute nodes 216. Compute nodes 216 may use a clustering algorithm of machine learning model 226 to intelligently group incident response alerts based on a determined context of incident response alerts. For example, compute nodes 216 may use the clustering algorithm of machine learning model 226 to tokenize words included in summaries of incident response alerts. Compute nodes 216 may use the clustering algorithm of machine learning model 226 to assign weights to the tokenized words. Compute nodes 216 may use the clustering algorithm of machine learning model 226 to compare the assigned weights to weights of alert groups maintained by alert group manager 236. Compute nodes 216 may use the clustering algorithm of machine learning model 226 to group an incident response alert to an alert group based on assigned weights associated with the incident response alert being similar or near to weights associated with the alert group. Compute node 216 may use the clustering algorithm of machine learning model 226 to group an alert to an alert group based on the assigned weights satisfying a similarity threshold when compared to weights of alert group contexts of alert groups. For example, compute node 216 may add an alert to an alert group based on weight values associated with the alert being within a predefined limit (e.g., a similarity threshold) to weight values associated with an alert group. Compute nodes 216 may store an alert group including a new incident response alert with alert group manager 236. In some instances, compute nodes 216 may send determined alert contexts for an incident response alert to alert group manager 236.

Alert group manager 236 may maintain alert groups. Alert group manager 236 may send alert groups to incident engine 228 to determine an incident based on the alert group and notify responders of the incident, for example. In some instances, alert group manager 236 may update alert group contexts based on alert contexts received from compute nodes 216. For example, alert group manager 236 may update cluster-based weight values of an alert group context for an alert group based on weight values assigned to tokens associated with an incident response alert added to the alert group.

Figure 3A:
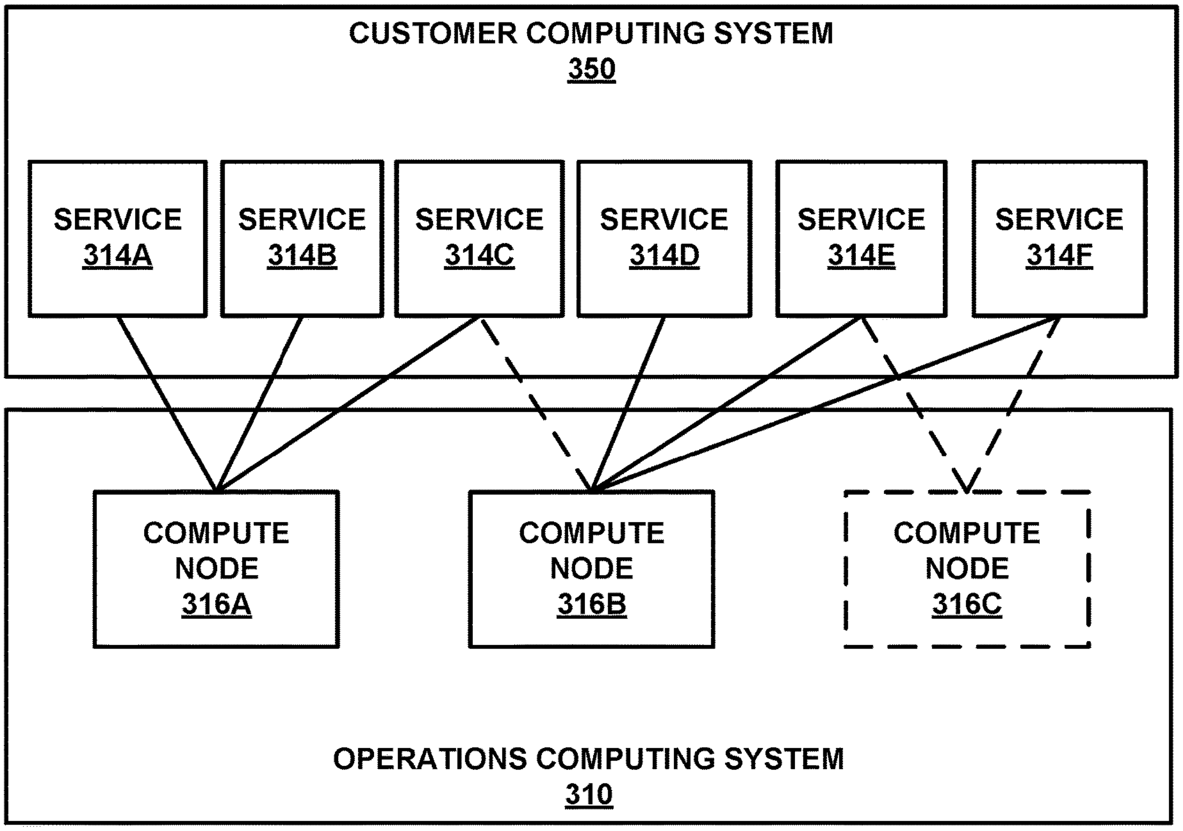
FIGS. 3A-3C are conceptual diagrams illustrating an example process of reassigning services to compute nodes of a set of compute nodes, in accordance with techniques of this disclosure.
Figure 3B:
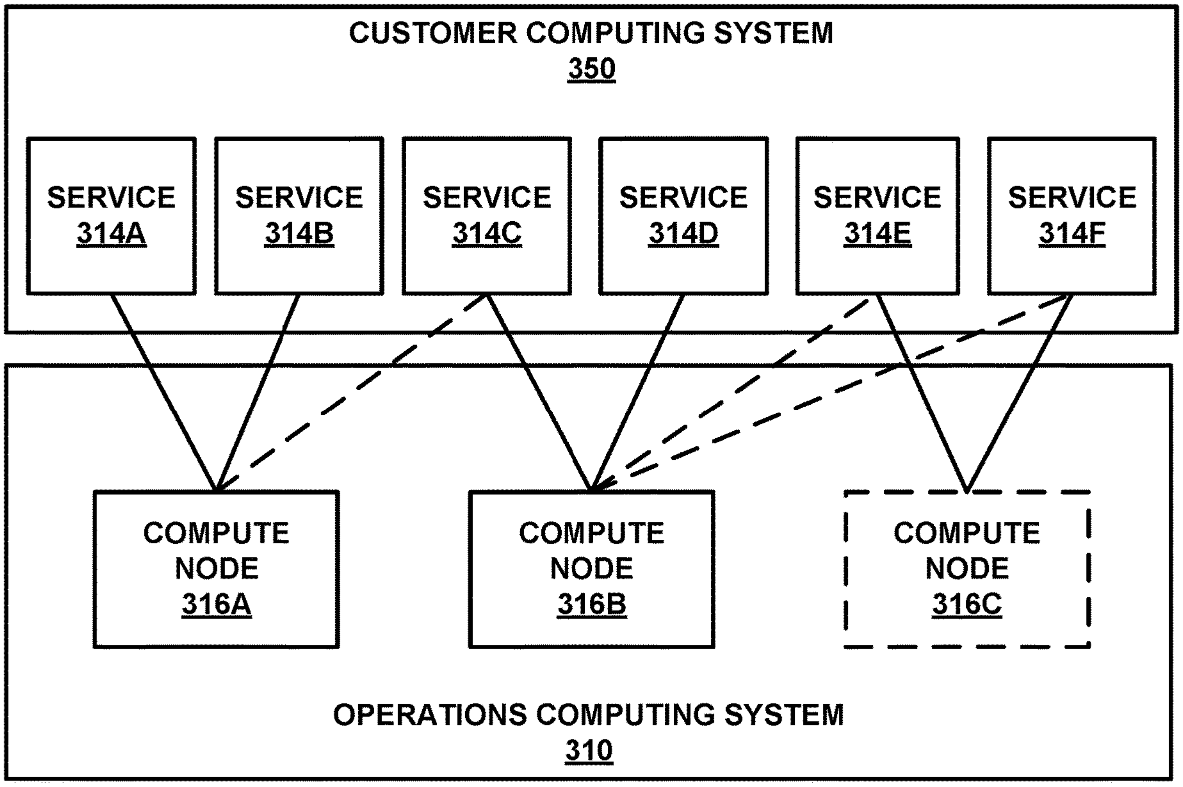
Figure 3C:
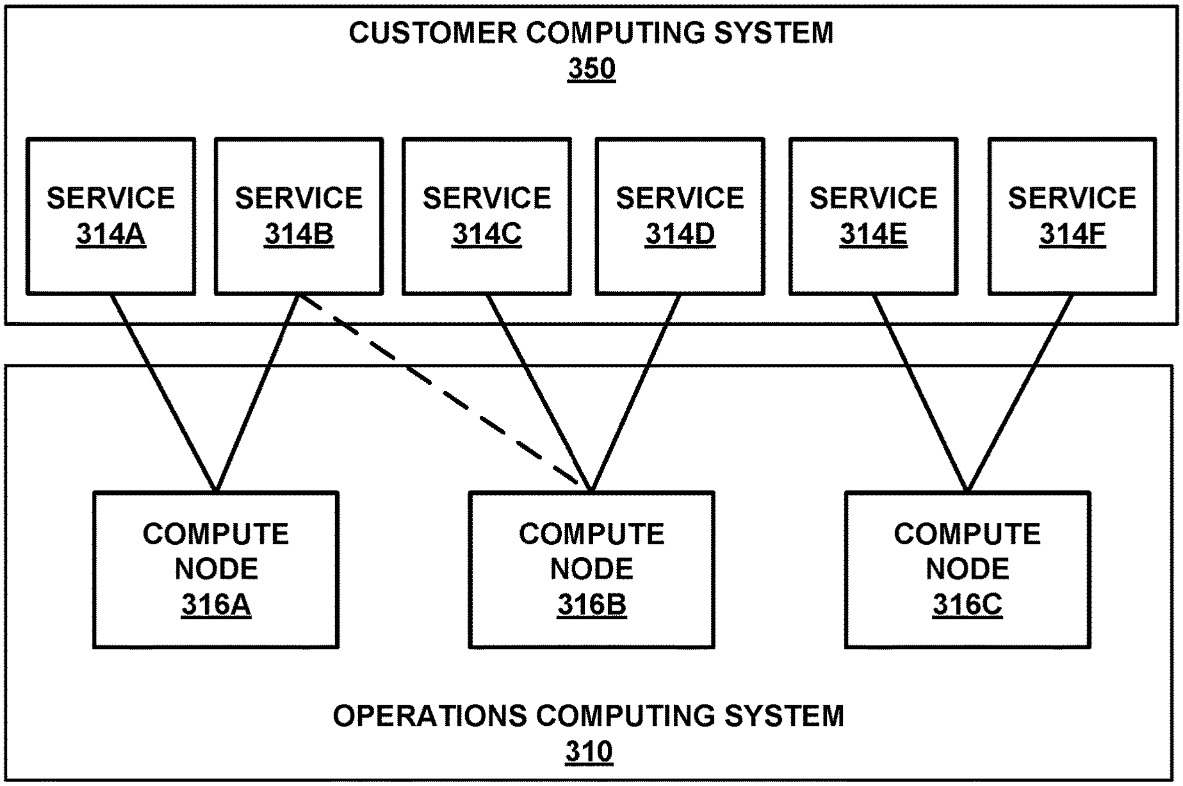

FIGS. 3A-3C are conceptual diagrams illustrating an example process of reassigning services to compute nodes of a set of compute nodes, in accordance with techniques of this disclosure. Customer computing system 350 and operations computing system 310 of FIGS. 3A-3C may be example or alternative implementations of customer computing systems 150 and operations computing system 110 of FIG. 1, respectively. In the examples of FIGS. 3A-3C, customer computing system 350 may include services 314A-314F (collectively referred to herein as "services 314") and operations computing system 310 may include compute nodes 316A-316C (collectively referred to herein as "compute nodes 316"). Services 314 and compute nodes 316 of FIGS. 3A-3C may be example or alternative implementations of services 114 and compute nodes 116 of FIG. 1, respectively. FIGS. 3A-3C may be described with respect to FIG. 2 for example purposes only.

In the example of FIG. 3A, compute node manager 218 may originally have assigned services 314A-314C to compute node 316A and services 314D-314F to compute node 316B. Compute node manager 218 may assign services 314 to compute nodes 316A and compute node 316B by providing service identifiers of services 314 to the respectively assigned compute nodes. Compute node manager 218, according to the example of FIG. 3A, may create compute node 316C. Compute node manager 218 may create compute node 316C by partitioning additional resources of operations computing system 310 to intelligently group incident response alerts using a clustering algorithm. In some instances, compute node manager 218 may create compute node 316C responsive to instructions received from alert group API 224. In some examples, compute node manager 218 may create compute node 316 based on a health of compute nodes 316A and 316B.

Compute node manager 218 may reassign services 314 to compute nodes 316. Compute node manager 218, in the example of FIG. 3A, may determine a partition number of two by dividing the number of services 314 (six in the example of FIG. 3A) by the number of compute nodes 316 (three in the example of FIG. 3A). Compute node manager 218 may reassign at least one service of services 314 to compute nodes 316 based on the partition number. In the example of FIG. 3A, compute node manager 218 may reassign service 314C to compute node 316B by instructing compute node 316A to delete the service identifier of service 314C and instructing compute node 316B to save the service identifier of service 314C. Compute node manager 218 may similarly reassign services 314E and 314F to compute node 316C by instructing compute node 316B to delete service identifiers of services 314E and 314F and instructing compute node 316C to save the service identifiers of services 314E and 314F. Compute node manager 218 may retrieve alert group contexts for reassigned services from alert group manager 236. Compute node manager 218 may provide the retrieved alert group contexts to newly created or newly reassigned compute nodes. For example, compute node manager 218 may provide alert group contexts for service 314C to compute node 316B and provide alert group contexts for services 314E and 314F to compute node 316C. In some instances, compute node manager 218 may instruct compute node 316A to delete alert group contexts for service 314C and instruct compute node 316B to delete alert group contexts for services 314E and 314F.

In the example of FIG. 3B, compute node manager 218 may originally have assigned services 314A-314B to compute node 316A, services 314C-314D to compute node 316B, and services 314E-314F to compute node 316C. Compute node manager 218 may assign services 314 to compute nodes 316 by providing service identifiers of services 314 to the respectively assigned compute nodes. Compute node manager 218, according to the example of FIG. 3B, may remove compute node 316C. Compute node manager 218 may remove compute node 316C by freeing up resources of operations computing system 310 originally allocated to compute node 316C. In some instances, compute node manager 218 may remove compute node 316C responsive to instructions received from alert group API 224. In some examples, compute node manager 218 may remove compute node 316 based on a health of compute nodes 316A and 316B (e.g., compute node 316C is defective or compute node 316C is not doing enough work and is deemed unnecessary).

Compute node manager 218 may reassign services 314 to compute nodes 316. Compute node manager 218, in the example of FIG. 3B, may determine a partition number of three by dividing the number of services 314 (six in the example of FIG. 3B) by the number of compute nodes 316 (two in the example of FIG. 3B). Compute node manager 218 may reassign at least one service of services 314 to compute nodes 316 based on the partition number. In the example of FIG. 3B, compute node manager 218 may reassign service 314C to compute node 316A by instructing compute node 316B to delete the service identifier of service 314C and instructing compute node 316A to save the service identifier of service 314C. Compute node manager 218 may similarly reassign services 314E and 314F to compute node 316B by instructing compute node 316B to save the service identifiers of services 314E and 314F. Compute node manager 218 may retrieve alert group contexts for reassigned services from alert group manager 236. Compute node manager 218 may provide the retrieved alert group contexts to newly created or newly reassigned compute nodes. For example, compute node manager 218 may provide alert group contexts for service 314C to compute node 316A and provide alert group contexts for services 314E and 314F to compute node 316B. In some instances, compute node manager 218 may instruct compute node 316B to delete alert group contexts for service 314C.

In the example of FIG. 3C, compute node manager 218 may originally have assigned services 314A-314B to compute node 316A, services 314C-314D to compute node 316B, and services 314E-314F to compute node 316C. Compute node manager 218 may assign services 314 to compute nodes 316 by providing service identifiers of services 314 to the respectively assigned compute nodes. Compute node manager 218, according to the example of FIG. 3C, may determine service 314A has high processing demand. For example, compute node manager 218 may determine service 314A is associated with network logs indicating service 314A has a high volume of incident response alerts or response times for grouping incident response alerts for service 314A is too slow (e.g., a health of compute node 316 satisfies an insufficient response time threshold for grouping alerts for service 314A). Compute node manager 218 may reassign service 314B to allow compute node 316A to dedicate more resources to grouping alerts for service 314A. Compute node manager 218, in the example of FIG. 3C, may determine compute node 316B does not have enough work. Compute node manager 218 may reassign service 314B to compute node 316B by instructing compute node 316A to delete the service identifier of service 314B and instructing compute node 316B to save the service identifier of service 314B. Compute node manager 218 may instruct compute node 316A to delete alert group contexts for service 314B and instruct compute node 316B to save alert group contexts for service 314B. Compute node manager 218 may provide compute node 316B alert group contexts for service 314B by retrieving the most recent alert group contexts for service 314B from alert group manager 236.

Figure 4:
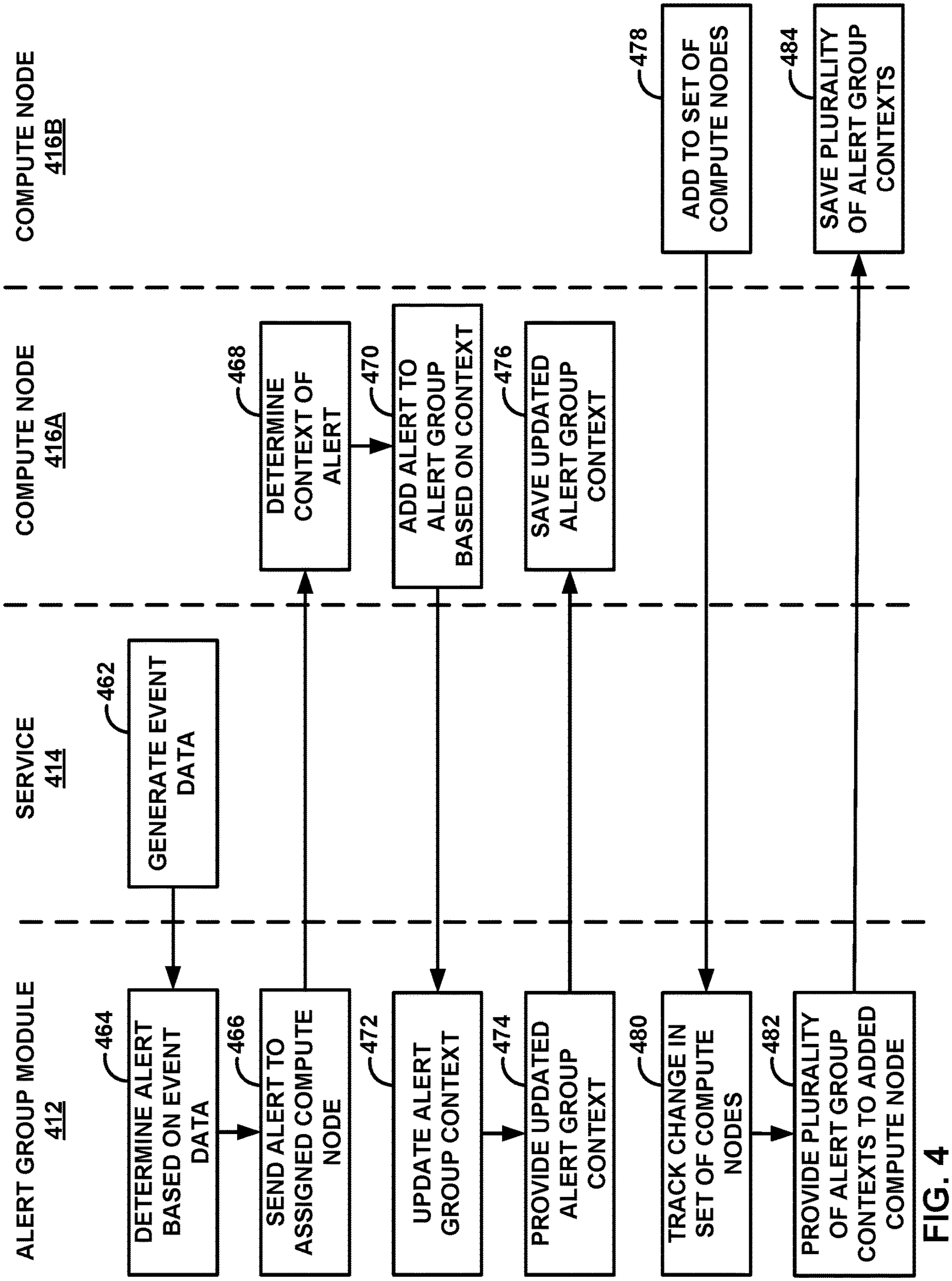
FIG. 4 is a flow chart illustrating an example process of sharing alert group contexts, in accordance with techniques of this disclosure.

FIG. 4 is a flow chart illustrating an example process of sharing alert group contexts, in accordance with techniques of this disclosure. Alert group module 412, service 414, and compute nodes 416A-416B of FIG. 4 may be example or alternative implementations of alert group module 112, service 114, and compute nodes 116 of FIG. 1, respectively. FIG. 4 may be described with respect to FIG. 2 for example purposes only.

Service 414 may generate event data (462). Service 414 may generate event data with an integrated service monitoring tool. Services 414 may send the event data to alert group module 412. Alert group module 412 may determine an alert based on the event data (464). Alert group module 412 may determine an alert by normalizing event data according to an incident response standard. Alert group module 412 may send the alert to an assigned compute node (466). In the example of FIG. 4, service 414 is assigned to compute node 416A. Alert group module 412 may maintain a table of service assignments and index the table based on the service identifiers of the services. Alert group module 412 may send the alert to compute node 416 based on the service identifier of service 414 included in metadata of the alert and the table listing compute node 416A as the assigned service.

Compute node 416A may determine a context of the alert (468). Compute node 416A may determine the context by providing a clustering algorithm a summary of the alert. Compute node 416A may add the alert to an alert group based on the context (470). Compute node 416A may add the alert by comparing tokenized weight value of the context of the alert to weight values of alert group contexts maintained by alert group manager 236. Compute node 416A may send the updated alert group with the alert and the determined alert group context to alert group module 412. Alert group module 412 may update the alert group context of the alert group (472). Alert group module 412 may update the alert group context of the alert group by normalizing tokenized weight values of alerts included in the updated alert group received from compute node 416A. Alert group module 412 may provide the updated alert group context to compute node 416A (474). Compute node 416A may save the updated alert group context for subsequent alert groupings (476).

Compute node 416B may be added to the set of compute nodes including compute node 416A (478). In some instances, compute node 416B may be added responsive to KPIs associated with services or the set of compute nodes. In some examples, compute node 416B may be added responsive to an API call. Alert group module 412 may track the change in the set of compute nodes (480). Alert group module 412 may include an API configured to supervise and monitor the set of compute nodes. Alert group module 412, in the example of FIG. 4, may track that the change in the set of compute nodes is that compute node 416B was added to the set of compute nodes. Alert group module 412 may provide a plurality of alert group contexts to the added compute node (482). Alert group module 412 may provide alert group contexts, including the most recently updated alert group context, to compute node 416B. Compute node 416B may save the plurality of alert group contexts for subsequent alert groupings (484).

Figure 5:
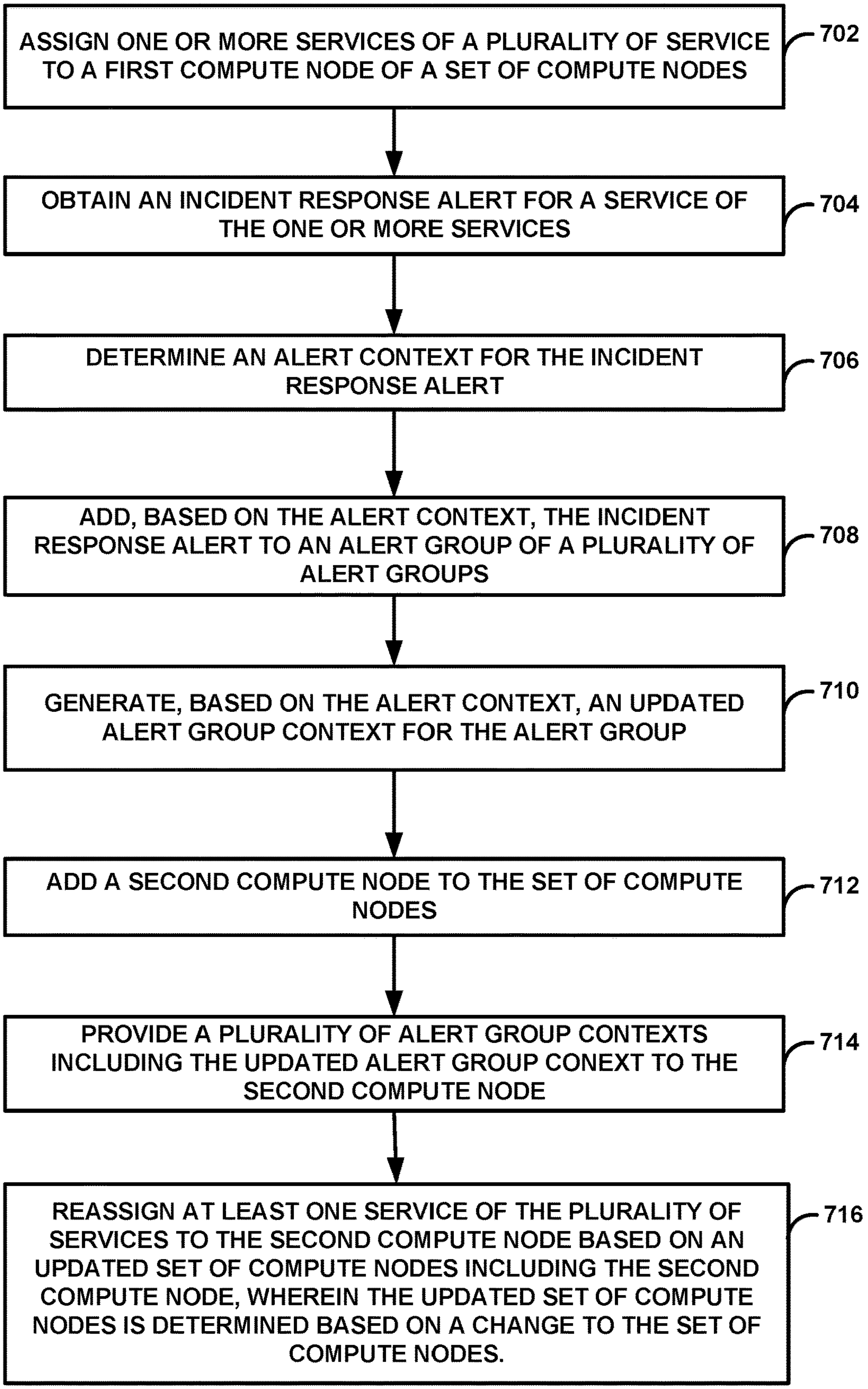
FIG. 5 is a flow chart illustrating an example process of managing incident response alert groups, in accordance with one or more aspects of the present disclosure.

FIG. 5 is a flow chart illustrating an example process of managing incident response alert groups, in accordance with one or more aspects of the present disclosure. FIG. 5 may be discussed with respect to FIG. 1 for example purposes only. Alert group module 112 may assign one or more services of a plurality of services (e.g., service 114 of FIG. 1) to a first compute node of a set of compute nodes (e.g., compute nodes 116 of FIG. 1) (702). Alert group module 112 may obtain an incident response alert for a service of the one or more services (704). The first compute node (e.g., compute node 416A of FIG. 4) may determine an alert context for the incident response alert (706). The first compute node may add, based on the alert context, the incident response alert to an alert group of a plurality of alert groups (708). Alert group module 112 may generate, based on the alert context, an updated alert group context for the alert group (710).

Alert group module 112 may add a second compute node to the set of compute nodes (712). Alert group module 112 may provide a plurality of alert group contexts including the updated alert group context to the second compute nodes (714). Alert group module may reassign at least one service of the plurality of services to the second compute node based on an updated set of compute nodes including the second compute node, wherein the updated set of compute nodes is determined based on a change to the set of compute nodes (716).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term “or” may be interrupted as “and/or” where context does not dictate otherwise. Additionally, while phrases such as “one or more” or “at least one” or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

assigning, by a computing system, one or more services of a plurality of services to a first compute node of a set of compute nodes, the set of compute nodes configured to contextually group incident response alerts for assigned services of the plurality of services;

obtaining, by the computing system, a first incident response alert for a service of the one or more services, the first incident response alert corresponding to first event data indicating a first disruption to the service;

determining, by the first compute node of the computing system, a first alert context for the first incident response alert, the first alert context including one or more data structures defining characteristics of the first incident response alert;

adding, by the first compute node and based on the first alert context, the first incident response alert to an alert group of a plurality of alert groups, the alert group including historical incident response alerts that are contextually similar to the first incident response alert;

generating, by the computing system and based on the first alert context, an updated alert group context for the alert group, the updated alert group context including one or more data structures defining shared characteristics of incident response alerts included in the alert group;

adding, by the computing system, a second compute node to the set of compute nodes to create an updated set of compute nodes configured to contextually group incident response alerts for assigned services of the plurality of services;

reassigning, by the computing system, at least one service of the plurality of services to the second compute node based on the updated set of compute nodes;

in response to the reassigning of the at least one service to the second compute node, providing, by the computing system and to the second compute node, a set of alert group contexts from a plurality of alert group contexts, wherein the set of alert group contexts corresponds to the at least one service reassigned to the second compute node, the plurality of alert group contexts including the updated alert group context, the set of alert group contexts including one or more data structures defining shared characteristics of incident response alerts included in at least one alert group corresponding to the at least one service reassigned to the second compute node;

determining, by the second compute node, a second alert context for a second incident response alert, wherein the second incident response alert corresponds to second event data indicating a second disruption to the at least one service reassigned to the second compute node, and wherein the second alert context includes one or more data structures defining characteristics of the second incident response alert;

adding, by the second compute node and based on the second alert context, the second incident response alert to one or more alert groups from a set of alert groups of the plurality of alert groups, the set of alert groups corresponding to the set of alert group contexts, the one or more alert groups including historical incident response alerts that are contextually similar to the second incident response alert; and in response to the adding of the second incident response alert to the one or more alert groups from the set of alert groups, updating, by the second compute node and based on the second alert context, one or more alert group contexts from the set of alert group contexts to include one or more data structures defining shared characteristics of incident response alerts included in the one or more alert groups from the set of alert groups.

2. The method of claim 1, wherein reassigning the at least one service to the second compute node comprises:

storing a record of network traffic associated with the at least one service; and reassigning the at least one service to the second compute node based on the record.

3. The method of claim 1, further comprising:

determining a health of the set of compute nodes; and adding the second compute node to the set of compute nodes based on the health of the set of compute nodes.

4. The method of claim 1, wherein each of the plurality of services is configured to support operations of respective customer systems of a plurality of customer systems.

5. The method of claim 1, wherein the first incident response alert indicates at least a portion of the first event data is processed according to an incident response standard associated with the service, wherein the first event data is associated with operations of a customer system supported by the service.

6. The method of claim 1, wherein contextually grouping incident response alerts for assigned services of the plurality of services reduces notification noise associated with outputting notifications for incident response alerts.

7. The method of claim 1, further comprising: outputting, by the computing system and to an on-call responder device for a customer system, a notification of an incident as a collection of incident response alerts in the alert group, wherein the service supports operations of the customer system.

8. The method of claim 1, wherein the at least one service includes the one or more services.

9. The method of claim 1, further comprising:

adding a third compute node to the set of compute nodes; and in response to reassigning services of the plurality of services to the third compute node based on the adding of the third compute node to the set of compute nodes, providing alert group contexts from the plurality of alert group contexts that correspond to the services reassigned to the third compute node.

10. The method of claim 9, further comprising:

removing the first compute node and the second compute node from the set of compute nodes; and reassigning the one or more services and the at least one service based on the removing of the first compute node and the second compute node from the set of compute nodes.

11. A system comprising one or more processors having access to a memory, the one or more processors configured to:

assign one or more services of a plurality of services to a first compute node of a set of compute nodes, the set of compute nodes configured to contextually group incident response alerts for assigned services of the plurality of services;

obtain a first incident response alert for a service of the one or more services, the first incident response alert corresponding to first event data indicating a first disruption to the service;

determine, by the first compute node, a first alert context for the first incident response alert, the first alert context including one or more data structures defining characteristics of the first incident response alert;

add, by the first compute node and based on the first alert context, the first incident response alert to an alert group of a plurality of alert groups, the alert group including historical incident response alerts that are contextually similar to the first incident response alert;

generate, based on the first alert context, an updated alert group context for the alert group, the updated alert group context including one or more data structures defining shared characteristics of incident response alerts included in the alert group;

add a second compute node to the set of compute nodes to create an updated set of compute nodes configured to contextually group incident response alerts for assigned services of the plurality of services;

reassign at least one service of the plurality of services to the second compute node based on the updated set of compute nodes;

in response to the reassigning of the at least one service to the second compute node, provide, to the second compute node, a set of alert group contexts from a plurality of alert group contexts, wherein the set of alert group contexts corresponds to the at least one service reassigned to the second compute node, the plurality of alert group contexts including the updated alert group context, the set of alert group contexts including one or more data structures defining shared characteristics of incident response alerts included in at least one alert group corresponding to the at least one service reassigned to the second compute node;

determine, by the second compute node, a second alert context for a second incident response alert, wherein the second incident response alert corresponds to second event data indicating a second disruption to the at least one service reassigned to the second compute node, and wherein the second alert context includes one or more data structures defining characteristics of the second incident response alert;

add, by the second compute node and based on the second alert context, the second incident response alert to one or more alert groups from a set of alert groups of the plurality of alert groups, the set of alert groups corresponding to the set of alert group contexts, the one or more alert groups including historical incident response alerts that are contextually similar to the second incident response alert; and in response to the adding of the second incident response alert to the one or more alert groups from the set of alert groups, update, by the second compute node and based on the second alert context, one or more alert group contexts from the set of alert group contexts to include one or more data structures defining shared characteristics of incident response alerts included in the one or more alert groups from the set of alert groups.

12. The system of claim 11, wherein to reassign the at least one service to the second compute node, the one or more processors are configured to:

store a record of network traffic associated with the at least one service; and reassign the at least one service to the second compute node based on the record.

13. The system of claim 11, wherein the one or more processors are further configured to:

determine a health of the set of compute nodes; and add the second compute node to the set of compute nodes based on the health of the set of compute nodes.

14. The system of claim 11, wherein to determine the first alert context, the one or more processors are configured to:

generate a token for each word included in a summary of the first incident response alert;

assign a weight to each generated token; and assign, based on the assigned weights, the first incident response alert to the alert group.

15. The system of claim 11, wherein to generate the updated alert group context, the one or more processors are configured to:

update an original set of weights of an original alert group context for the alert group based on a determined set of weights associated with the first alert context.

16. The system of claim 11, wherein to reassign the at least one service to the second compute node, the one or more processors are configured to:

generate a partition number by dividing a number of services included in the plurality of services by a number of compute nodes included in the updated set of compute nodes; and reassign the at least one service from the plurality of services to the second compute node of the updated set of compute nodes based on the partition number.

17. A computer-readable storage medium encoded with instructions that, when executed, cause at least one processor of a computing system to:

assign one or more services of a plurality of services to a first compute node of a set of compute nodes, the set of compute nodes configured to contextually group incident response alerts for assigned services of the plurality of services;

obtain a first incident response alert for a service of the one or more services, the first incident response alert corresponding to first event data indicating a first disruption to the service;

determine, by the first compute node, a first alert context for the first incident response alert, the first alert context including one or more data structures defining characteristics of the first incident response alert;

add, by the first compute node and based on the first alert context, the first incident response alert to an alert group of a plurality of alert groups, the alert group including historical incident response alerts that are contextually similar to the first incident response alert;

generate, based on the first alert context, an updated alert group context for the alert group, the updated alert group context including one or more data structures defining shared characteristics of incident response alerts included in the alert group;

add a second compute node to the set of compute nodes to create an updated set of compute nodes configured to contextually group incident response alerts for assigned services of the plurality of services;

reassign at least one service of the plurality of services to the second compute node based on the updated set of compute nodes;

in response to the reassigning of the at least one service to the second compute node, provide, to the second compute node, a set of alert group contexts from a plurality of alert group contexts, wherein the set of alert group contexts corresponds to the at least one service reassigned to the second compute node, the plurality of alert group contexts including the updated alert group context, the set of alert group contexts including one or more data structures defining shared characteristics of incident response alerts included in at least one alert group corresponding to the at least one service reassigned to the second compute node;

determine, by the second compute node, a second alert context for a second incident response alert, wherein the second incident response alert corresponds to second event data indicating a second disruption to the at least one service reassigned to the second compute node, and wherein the second alert context includes one or more data structures defining characteristics of the second incident response alert;

add, by the second compute node and based on the second alert context, the second incident response alert to one or more alert groups from a set of alert groups of the plurality of alert groups, the set of alert groups corresponding to the set of alert group contexts, the one or more alert groups including historical incident response alerts that are contextually similar to the second incident response alert; and in response to the adding of the second incident response alert to the one or more alert groups from the set of alert groups, update, by the second compute node and based on the second alert context, one or more alert group contexts from the set of alert group contexts to include one or more data structures defining shared characteristics of incident response alerts included in the one or more alert groups from the set of alert groups.

18. The computer-readable storage medium of claim 17, wherein to reassign the at least one service to the second compute node, the instructions cause the at least one processor to:

store a record of network traffic associated with the at least one service; and reassign the at least one service to the second compute node based on the record.

19. The computer-readable storage medium of claim 17, wherein the instructions further cause the at least one processor to:

determine a health of the set of compute nodes; and add the second compute node to the set of compute nodes based on the health of the set of compute nodes.

20. The computer-readable storage medium of claim 17, wherein to determine the first alert context, the instructions cause the at least one processor to:

generate a token for each word included in a summary of the first incident response alert;

assign a weight to each generated token; and assign, based on the assigned weights, the first incident response alert to the alert group.

* * * * *